United States Patent [19]

Evans et al.

[11] 4,196,716
[45] Apr. 8, 1980

[54] INERT FOCUSING PHOTON ENERGY COLLECTOR

[76] Inventors: Glenn A. Evans, Rte. 7, Box 384, Reeds Chapel Rd.; James W. Ford, Jr., Box 213-T, Rte. 8, both of Morristown, Tenn. 37814

[21] Appl. No.: 795,951

[22] Filed: May 11, 1977

[51] Int. Cl.² .............................................. F24J 3/02
[52] U.S. Cl. .................................... 126/271; 126/442
[58] Field of Search ............... 126/270, 271; 237/1 A; 60/641

[56] References Cited

U.S. PATENT DOCUMENTS

| | | | |
|---|---|---|---|
| 1,081,098 | 12/1913 | Garza | 126/270 |
| 1,258,405 | 3/1918 | Harrison | 126/271 |
| 2,277,311 | 3/1942 | Freeman | 126/271 |
| 3,901,036 | 8/1975 | Martin | 60/641 |
| 3,965,683 | 6/1976 | Dix | 60/641 |

Primary Examiner—Kenneth W. Sprague
Attorney, Agent, or Firm—Luedeka & Hodges; Luedeka & Hodges

[57] ABSTRACT

The Inert Focusing "Photon" Energy Collector is a device used to focus the sun rays (or photons) on a piece of metal properly arranged geometrically for the greatest concentration of available photons for the purpose of absorbing, transferring, and, depending on the intent, for temporary or permanent storing of the energy collected. The desirable feature of the device is that it does not require any complicated sun tracking mechanism to maintain the ability to focus the photons during the sun's daylight cycle. The device allows for modification (decreased or increased storage volume) to allow high temperature water to be provided with minimum power consumption by circulation pumps.

6 Claims, 6 Drawing Figures

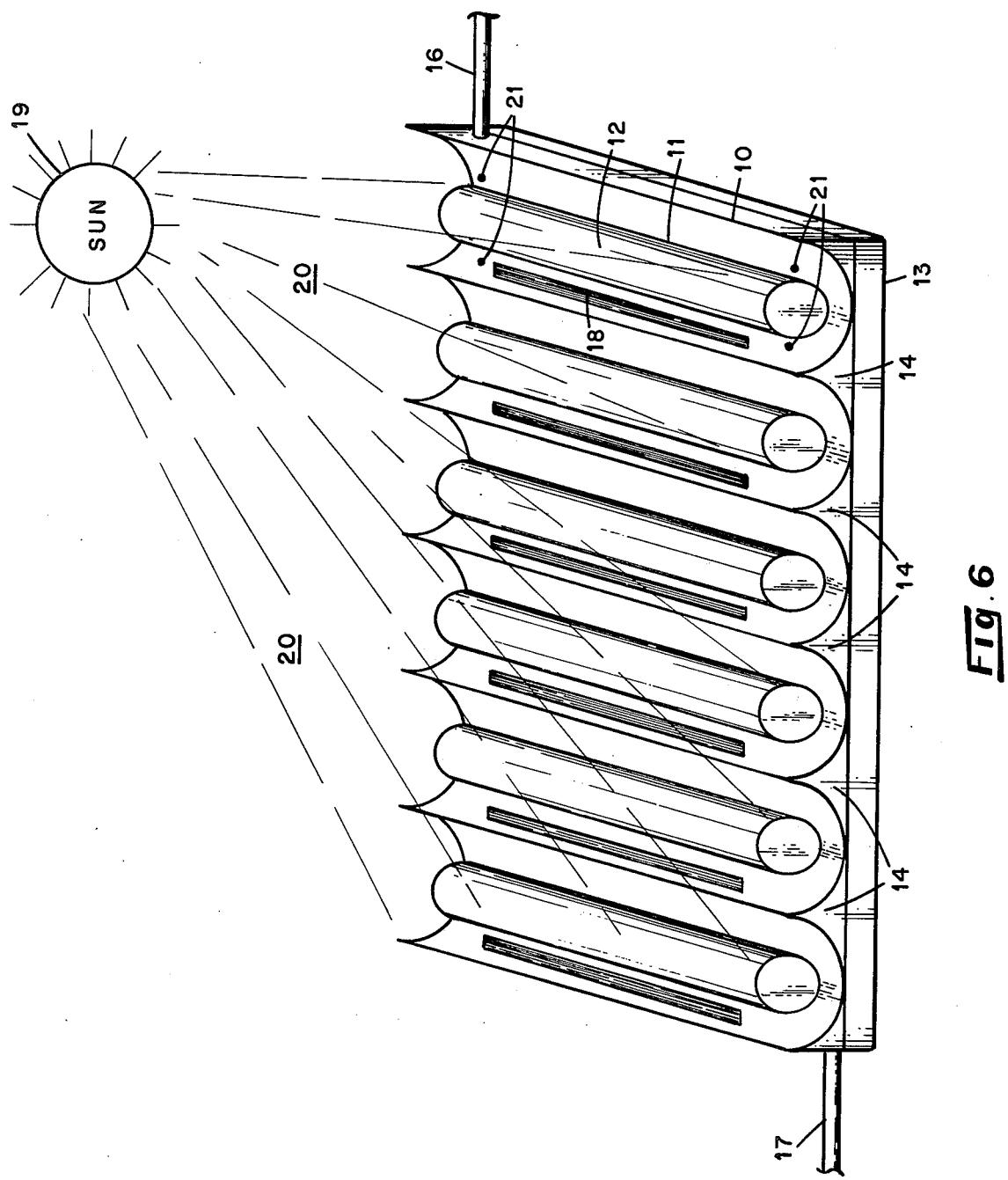

INERT FOCUSING PHOTON ENERGY COLLECTOR

BACKGROUND OF THE INVENTION

This invention relates generally to the collection of sunlight and its conversion by this solar heat collector and more particularly to the ability to focus the photons and produce a high temperature and corresponding amount of heat on the concaved metal receptacle used for the absorber of the photons received.

Solar heat collectors, that of the flat surface type and the use of the sun rays shining through a glass, are well known in the art. These collectors normally collect the photons in a copper absorber without any focusing or magnification abilities.

The present invention provides an improved method of collecting solar energy and producing greater temperatures applied to the absorber.

SUMMARY OF THE INVENTION

In accordance with the preferred form of the invention, there is provided a round transparent cylinder type container filled with a transparent liquid or as a solid (e.g., pyrex, lucite, etc.) a sheet of 0.014 copper metal formed as to allow the said container to be cradled (by means of standoff copper pins) at the proper focus point, not necessarily a sharp focus (depending on use and functions) just above the said copper metal. Sizes of said containers and dimensions of said copper metal are dependent on the volume collector desired and structural constraints thus forming a concave (180 degree) curve of the said copper metal relative to incoming sunlight and exposing this surface (prepared to maximum absorption) of the said storage container to the sun. Other sheets of copper metal are attached to both ends, sides, and bottom of the said formed copper metal thus making a watertight storage of variable capacity. Proper fittings are provided for said tank for connection to water supply or auxiliary storage as to allow water to circulate through said tank, absorb heat, and then transfer this heat to a storage tank or cycle within the collector's storage by means of a natural flow pump with controlled valves or by any other mechanical or hydraulic means.

The collector is provided with an insulated box structure for additional absorption of the sun rays consisting of the interior surfaces of said box covered with reflective styrofoam and/or reflective surfaces and/or absorbent surface coatings. The storage tank is intended to rest with an air gap above the box back by standoffs from the box surface with entire assembly with plate glass sealed by mechanical or chemical means. Thus by placing said assembly facing to the south with full exposure of said transparent liquid or solid facing the full exposure of the sunlight, said container will continue to focus sun rays (or photons) on said copper metal regardless of the sun's position producing a greater amount of temperature at the focus point during the sun's cycle while bringing diffused sunlight to focus on the receptacle.

BRIEF DESCRIPTION OF THE DRAWINGS

The accompanying drawings illustrate the invention. In such drawings:

FIG. 6 is showing sun rays magnifying on a six unit Inert Focusing "Photon" Energy Collector.

DETAILED DESCRIPTION OF THE PREFERRED EMBODIMENT

Figure 1:
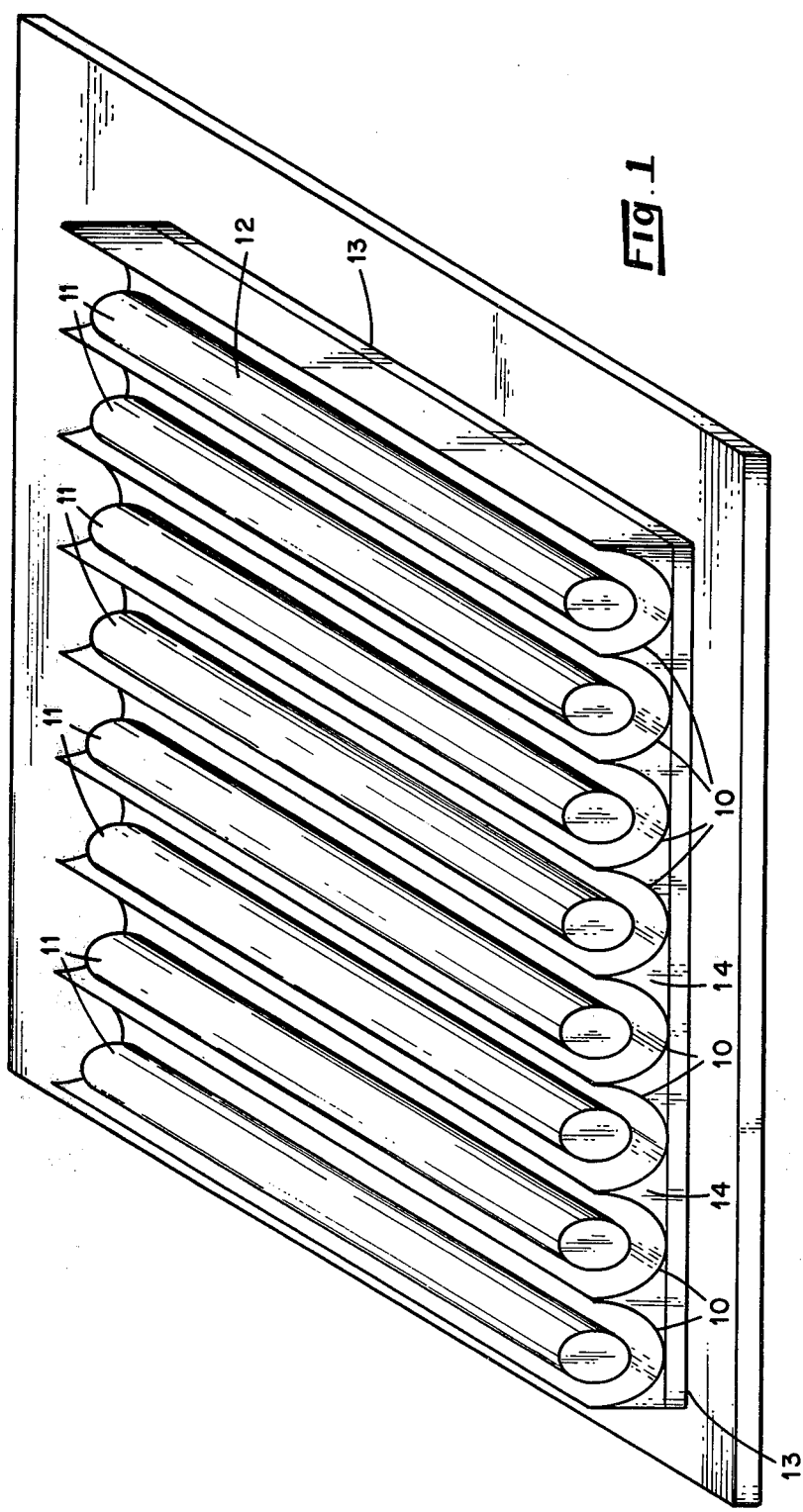
FIG. 1 is a top view of an eight unit focusing "Photon" Energy Collector.
Figure 2:
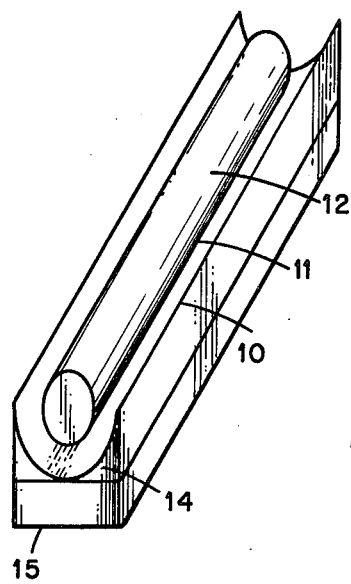
FIG. 2 is one of the Collector's units shown in FIG. 1.
Figure 3:
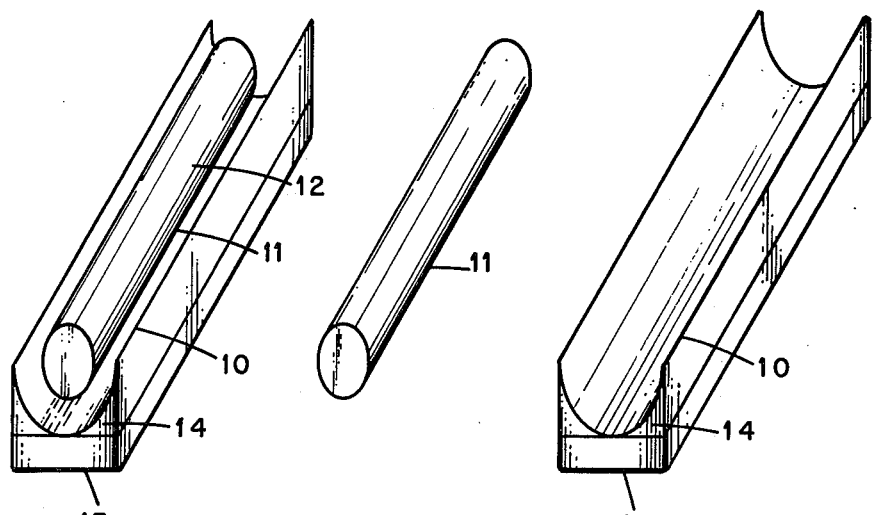
FIG. 3 is showing one formed concaved copper or other metal and one transparent container filled with transparent liquid or as a solid cradled in the formed concaved copper or other metal.
Figure 4:
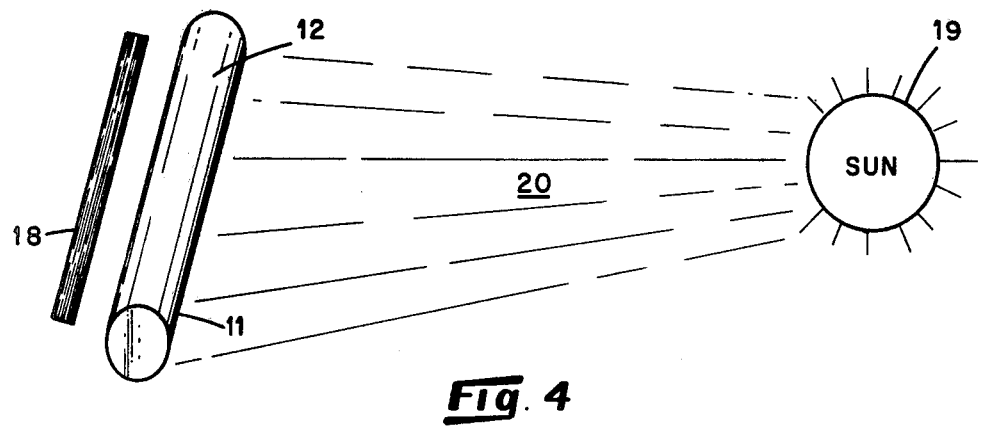
FIG. 4 is showing sun rays magnified through transparent container filled with transparent liquid.
Figure 5:
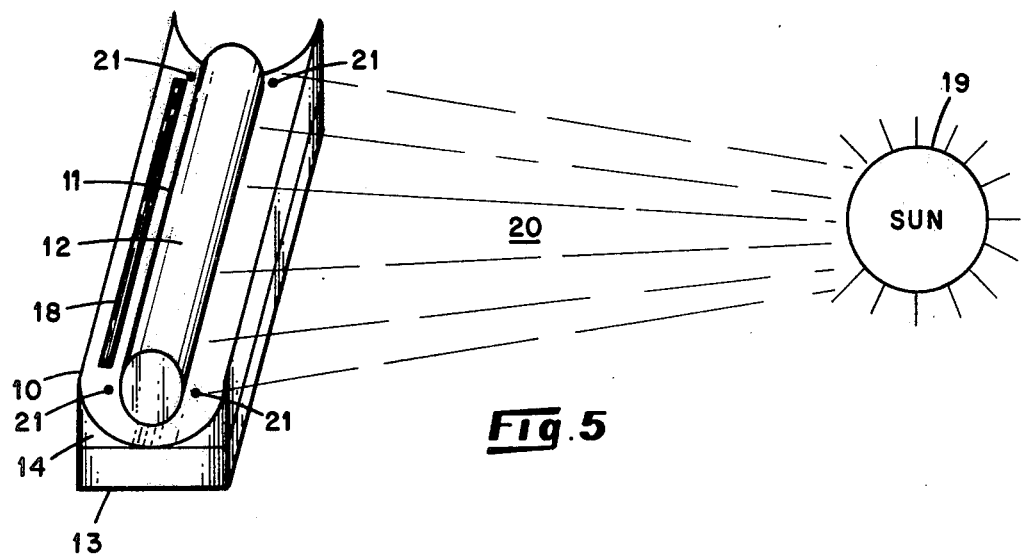
FIG. 5 is showing sun rays focused through the filled container and concentrating magnified rays on formed concaved copper or other metal.

In the embodiment of the Inert Focusing "Photon" Energy Collector illustrated in the drawings, there is provided a sheet of formed 0.014 copper metal (item 10). Said copper metal is formed as to allow transparent container (item 11) or solid to be cradled with assistance of copper standoff pins (item 21) to receive the focused sunlight of said transparent container or solid (item 11).

The unit is further provided with additional 0.014 copper metal for ends and sides to form a tank (item 14) for the purpose of circulating water. This tank may be of variable dimension to provide for different uses or functions.

The transparent container (item 11) is filled with a transparent liquid (item 12) or may be left as a solid focusing device to rest on standoff pins (item 21) to allow the sun (item 19) to transmit rays (item 20) to transparent container and transparent liquid or solid it used (item 12) to focus said rays (item 20) and concentrate the focused rays (item 18) on said copper metal (item 10).

The Inert Focusing "Photon" Energy Collector is further provided with proper water connections (item 17) for incoming cooler water to circulate through tank (item 14), obtain heat, and transfer through outlet (item 16) to external storage tank, hot water heater, or like, or, if desired, to be stored in the collector tank (sized to handle collector storage).

The formed copper metal surface should be made rough textured with small formed deep cavities (for light trapping) and then painted an absorbent color (e.g., pale green or "selective black"). The cavities help prevent the rays from bouncing off and color helps in total absorption of the light rays.

The transparent container (item 11) is filled with said transparent liquid (item 12) or clear solid. While the inventor used mineral oil as a liquid, other transparent liquids which do not break down in sunlight may be used.

The Collector is made with as many units as desired. Sizes and dimensions will depend on the amount of heat accumulation desired. The unit is placed in a properly insulated box and covered with transparent glass (preferably double sealed) and placed in a location to allow the sun to cast rays through the transparent focusing cylinders during daylight sun's cycle.

The present inert focusing "photon" energy collector comprises a transparent cylinder/container, transparent focusing cylinder (either liquid or solid), and a concave conducting metal absorber.

The transparent cylinder is filled with a transparent liquid or is used as a solid and cradled over a concaved formed metal tank covered with transparent glass and placed in such a position as to expose the collector to sunlight. The sun rays will pass through said transparent glass into said transparent cylinder, solid or filled with said transparent liquid, and be focused providing a greater amount of photons on a portion of said tank subject to the focusing action of the cylinder. Said photons will heat said concaved metal (copper used in original design but does not exclude other metals). Said concaved metal will transfer heat to water in said tank by conduction and then water heated would be transferred to other external storage or held in collator tank as designed by use.

With the collector placed in a sunlit exposure, the sun will continue to focus its rays through said transparent cylinder and concentrating said photons on said concaved formed metal during the daytime cycle. The sunlight (photons) will be focused across entire 180 degrees surface of said concaved metal starting at the west side of said concaved formed metal when sun is in morning hours and end on the east side during late afternoon hours.

This collector further has the advantage that it will provide a quick start to operating temperatures (from focusing action). In addition, for small collectors tank size, said collector provides for high temperatures potentially applicable to solar cooling.

To increase efficiency of said collector, place a mirror to reflect the sun rays on said transparent containers in such a fashion as not to inhibit east-west collection. Focusing action can be achieved by either horizontal or vertical orientation of focusing cylinders and concaved formed metal absorber.

We claim:

1. A focusing solar collector comprising a first generally planar wall member defining a plurality of generally aligned elongated troughs each of which possesses an arcuate cross section which is substantially uniform along the length of said trough and which defines a surface exposed for receiving solar radiation thereupon, and further including a second generally planar wall member that is oriented substantially parallel to the plane occupied by said first surface, and end and side walls joining the peripheral edges of said first and second wall members to define a liquid receptacle, a heat transfer liquid essentially filling said receptacle, means defining an inlet for liquid flow into said receptacle, means defining an outlet for liquid flow out of said receptacle, a plurality of elongated tubular members which are transparent to a substantial portion of solar radiation incident thereupon, and means supporting one of said tubular members in spaced apart relationship to said exposed surface of one of said troughs wherein the distance of said tubular member from said exposed surface at all points of said surface is substantially equal to the focal length of said tubular member when considered in cross section thereof.

2. The solar collector of claim 1 wherein each of said tubular members comprises a transparent tube filled with a transparent liquid and closed at its opposite ends.

3. The solar collector of claim 1 wherein said tubular member comprises a solid transparent material.

4. The solar collector of claim 1 wherein said first and second wall members comprise copper sheet.

5. The solar collector of claim 4 wherein the thickness of said copper sheet is about 0.014 inch.

6. The solar collector of claim 1 wherein said exposed surface of each of said troughs describes an arc that is substantially equal to the path followed by the focal point of said tubular member aligned therewith and considered in cross section, when said collector is stationary and oriented with the longitudinal axis of said tubular member aligned generally north and south and the rays of the sun are incident upon said tubular member during a daylight cycle.

* * * * *